United States Patent
Yamashita (10) Patent No.: US 11,836,033 B2
(45) Date of Patent: Dec. 5, 2023

(54) INFORMATION PROCESSING APPARATUS AND CONTROL METHOD FOR CONTROLLING INFORMATION PROCESSING APPARATUS

(71) Applicant: CANON KABUSHIKI KAISHA, Tokyo (JP)

(72) Inventor: Takahiro Yamashita, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/819,790

(22) Filed: Aug. 15, 2022

(65) Prior Publication Data

US 2023/0063956 A1    Mar. 2, 2023

(30) Foreign Application Priority Data

Aug. 26, 2021    (JP) .................................. 2021-137678

(51) Int. Cl.
*G06F 11/00* (2006.01)
*G06F 11/07* (2006.01)

(52) U.S. Cl.
CPC ...... *G06F 11/0727* (2013.01); *G06F 11/0772* (2013.01); *G06F 11/0793* (2013.01)

(58) Field of Classification Search
CPC ............ G06F 11/0727; G06F 11/0772; G06F 11/0793
See application file for complete search history.

(56) References Cited

U.S. PATENT DOCUMENTS

| | | | | |
|---|---|---|---|---|
| 2005/0270855 | A1* | 12/2005 | Earhart | G06F 11/1076 365/189.05 |
| 2009/0319801 | A1* | 12/2009 | Aciicmez | H04L 9/0872 713/189 |
| 2018/0285219 | A1* | 10/2018 | Donlan | G06F 11/1662 |
| 2020/0310660 | A1* | 10/2020 | Xie | G06F 3/0653 |
| 2021/0165890 | A1* | 6/2021 | Schvey | G06F 21/6218 |

FOREIGN PATENT DOCUMENTS

JP    2004362221 A    12/2004

* cited by examiner

*Primary Examiner* — Joshua P Lottich
(74) *Attorney, Agent, or Firm* — Canon U.S.A., Inc. IP Division (57) ABSTRACT

In a case where read information is a reading start location of second information, a controller causes a storage device to store location information regarding the read information as second location information, and in a case where the read information is not the reading start location of the second information, the controller causes a reading unit to read information based on location information different from the location information.

13 Claims, 5 Drawing Sheets

INFORMATION PROCESSING APPARATUS AND CONTROL METHOD FOR CONTROLLING INFORMATION PROCESSING APPARATUS

BACKGROUND

Field of the Disclosure

The present disclosure relates to an information processing apparatus and a control method for controlling an information processing apparatus.

Description of the Related Art

In recent years, there is an image forming apparatus having a tampering detection function for, when a program is started, performing a signature verification process on the program to be started, thereby determining whether the program is valid, and preventing a tampered program from starting. There is also an image forming apparatus having a restoration function for, if tampering is detected at this time, overwriting the tampered program with a program as a backup, thereby restoring the program from the tampering. Similarly, there is an image forming apparatus having a function of also detecting tampering or corruption of partition information in a storage device that holds a program, and recovering the partition information.

Regarding partition information, the publication of Japanese Patent Application Laid-Open No. 2004-362221 discusses a technique for, according to a start mode, rewriting information described in a master boot record (MBR) that handles partition information in storage, thereby changing the apparent capacity of the storage.

If information regarding a partition included in an MBR becomes unreadable, the reading start location of the information is unknown. If the reading start location is present at a predetermined location with respect to the capacity of storage, the information can be recovered. However, there is a case where the reading start location is not present at the predetermined location with respect to the capacity of the storage. In this case, the information regarding the partition recorded in the MBR may not be able to be recovered.

SUMMARY

According to an aspect of the present disclosure, an information processing apparatus includes a non-volatile storage device including a first storage area managed by at least one partition and a second storage area that is not managed, and storing first information including partition information regarding the partition, second information including the partition information, and management information including first location information indicating a reading start location of the first information and second location information indicating a reading start location of the second information, a reading unit configured to read information based on location information, and a control unit configured to, in a case where the read information is the reading start location of the second information, cause the storage device to store the location information regarding the read information as the second location information, and in a case where the read information is not the reading start location of the second information, cause the reading unit to read information based on location information different from the location information.

Further features of various embodiments will become apparent from the following description of exemplary embodiments with reference to the attached drawings.

DESCRIPTION OF THE EMBODIMENTS

Exemplary embodiments will now be described in detail with reference to the attached drawings. The following exemplary embodiments do not limit every embodiment, and not all the combinations of the features described in the exemplary embodiments are essential for a method for solving the issues in the present disclosure. The present exemplary embodiments are described using an image processing apparatus as an example of an information processing apparatus, but are not limited to this.

Figure 1:
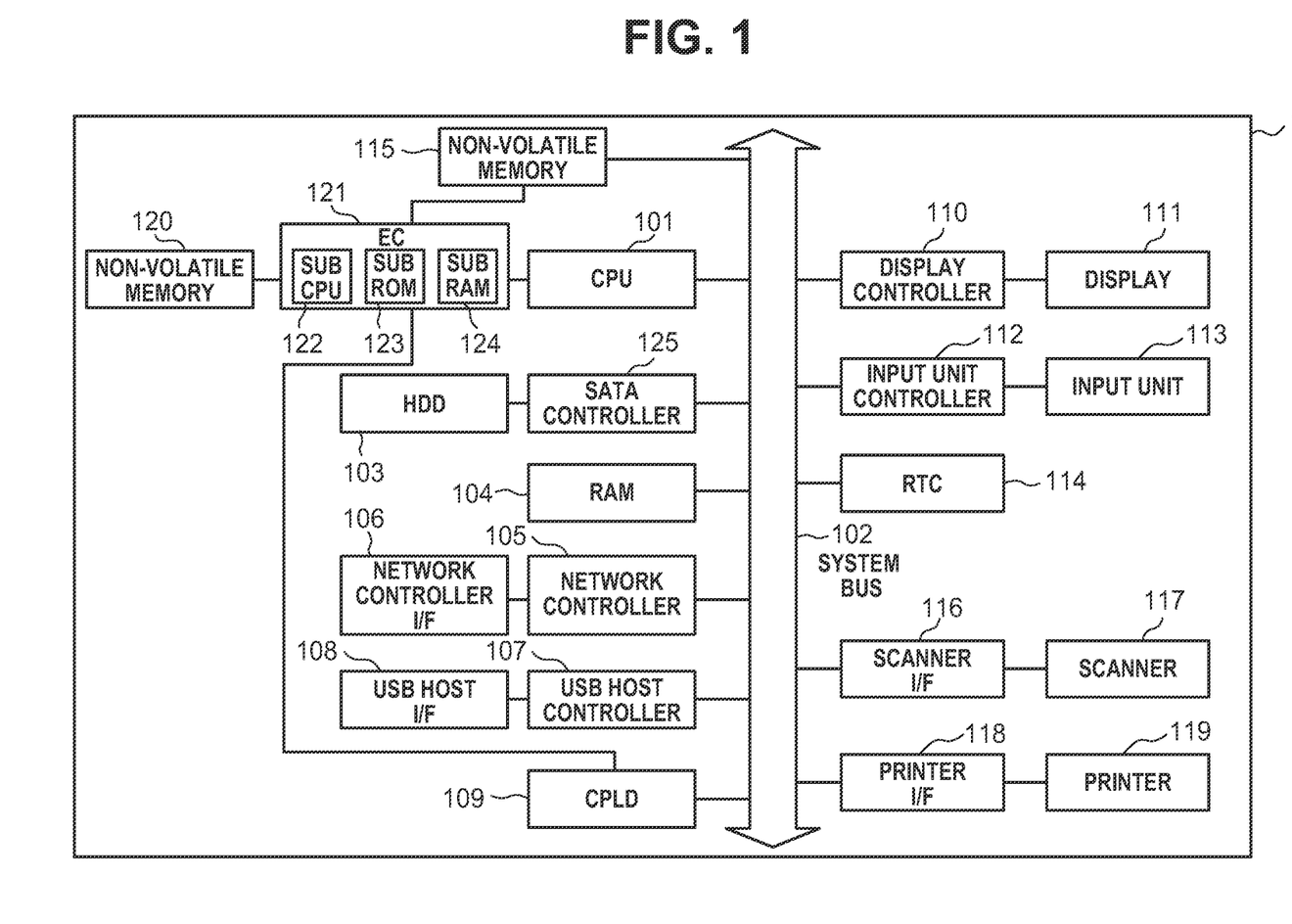
FIG. 1 is a block diagram illustrating a hardware configuration of an image forming apparatus.

FIG. 1 is a hardware configuration diagram of an image forming apparatus 1 according to a first exemplary embodiment. The configuration of the image forming apparatus 1 is described with reference to FIG. 1. The image forming apparatus 1 includes a central processing unit (hereinafter, "CPU") 101 that causes software for activating the image forming apparatus 1 to operate. A system bus 102 is a path through which the CPU 101 accesses other units and the other units access each other.

A hard disk unit (hereinafter, "hard disk drive (HDD)") 103 connects to the system bus 102 via a Serial AT Attachment (SATA) controller 125. The HDD 103 stores software for the image forming apparatus 1, various programs used for the operation of the image forming apparatus 1, a database, and a temporarily saved file. Although the HDD 103, which is a non-volatile magnetic storage device, is used as an example, a solid-state drive (SSD) or an embedded MultiMediaCard (eMMC), which is a non-volatile semiconductor storage device, may be used.

A random-access memory (hereinafter, "RAM") 104 is a storage area into which a program for the image forming apparatus 1 is loaded and which stores a variable when the program operates and data transferred from each unit by direct memory access (hereinafter, "DMA"). A network controller 105 and a network controller interface (I/F) 106 perform communication between the image forming apparatus 1 and another device on a network. A Universal Serial Bus (USB) host controller 107 and a USB host I/F 108 control communication between the image forming apparatus 1 and a USB device. The USB host I/F 108 is connected to the USB device using a USB cable. Depending on the form of the USB device, the USB host I/F 108 is directly connected to the USB device without using the USB cable.

A display 111 displays the operating state of the image forming apparatus 1 so that a user can confirm the operating state of the image forming apparatus 1. A display controller 110 controls display on the display 111. An input unit 113 receives an instruction from the user to the image forming apparatus 1. An input unit controller 112 controls the input unit 113. Specifically, the input unit 113 is an input system, such as a keyboard, a mouse, a numeric keypad, a cursor key, a touch panel, or an operation unit keyboard. In a case where the input unit 113 is a touch panel, the physical mounting form of the input unit 113 is such that the input unit 113 is attached to the surface of the display 111. A real-time clock (hereinafter, "RTC") 114 has, for example, a clock function, an alarm function, and a timer function of the image forming apparatus 1. A non-volatile memory 115 is a rewritable non-volatile memory.

A complex programmable logic device (CPLD) 109 is a unit that reads the low or high state of a signal line on a substrate circuit via the CPU 101 or enables the CPU 101 to change the setting of the low or high state.

The CPLD 109 is a programmable logic device and is a unit that enables control of the turning off and on of power on the image forming apparatus 1. Within the CPLD 109, a general-purpose input/output (hereinafter, "GPIO") exists. The CPU 101 changes the setting value of a register of the GPIO, thereby enabling the turning off and on of power. A scanner 117 is connected to the image forming apparatus 1 via the system bus 102 and a scanner interface 116. A printer 119 is also connected to the image forming apparatus 1 via the system bus 102 and a printer interface 118.

An embedded controller (EC) 121 including a sub CPU 122, a sub ROM 123, and a sub RAM 124 verifies the validity of a basic input/output system (BIOS) program in the non-volatile memory 115.

When a current is applied to the EC 121, the sub CPU 122 executes a program stored in the sub ROM 123. By executing this process, the sub CPU 122 reads embedded controller firmware (ECFW) in the non-volatile memory 115 and loads the ECFW into the sub RAM 124.

Using the program loaded into the sub RAM 124, the sub CPU 122 verifies whether the non-volatile memory 115 is tampered. The EC 121 is also connected to the non-volatile memory 120 which is used for backup. If the EC 121 determines that the non-volatile memory 115 is in a tampered state, the EC 121 overwrites the non-volatile memory 115 with the copied content of the non-volatile memory 120.

The scanner 117 connects to the system bus 102 via the scanner interface 116. The scanner 117 optically reads an image from a document and converts the read image into a digital image.

The printer 119 connects to the system bus 102 via a printer interface 118. The printer 119 outputs a digital image to a paper medium.

Figure 2:
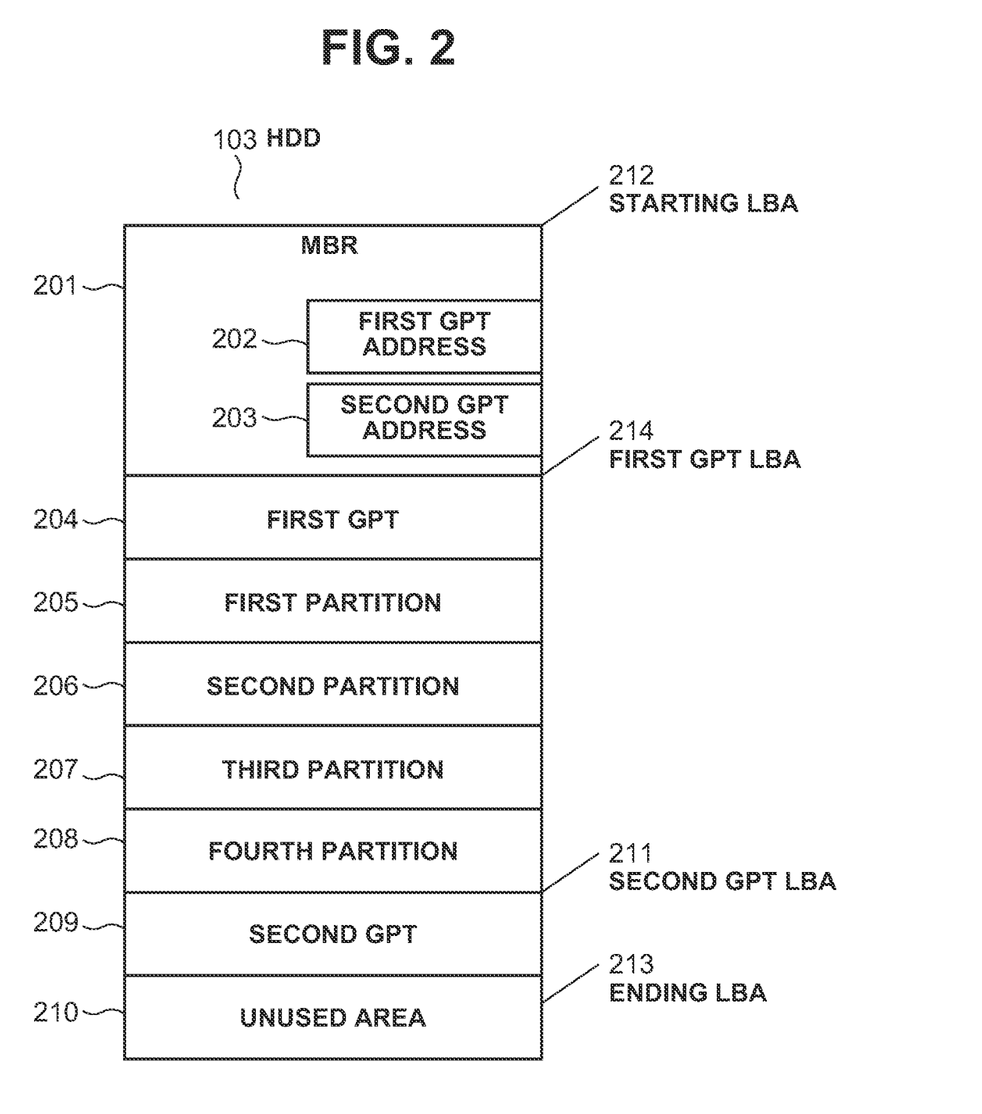
FIG. 2 is a block diagram illustrating an internal configuration of a hard disk drive (HDD).

FIG. 2 is a diagram illustrating the contents of the HDD 103 for descriptive purposes. The higher the position is in FIG. 2, the closer to the start of addresses in the HDD 103 the area is. An example is described where logical block addressing (LBA) is used as location information. "LBA" refers to a technique for partitioning a storage device, such as an HDD, into unit sizes and identifying a location by an index number from the start of the partitions. "LBA" also refers to the unit of location information regarding the identified location. If the unit of LBA is 512 bytes (B), LBA 0 indicates, for example, a sector from the start to the 511th byte of the storage device. LBA 100 indicates a sector from the 51200th byte to the 51711th byte. Although FIG. 2 illustrates the location of each LBA in a simplified manner, the LBA actually has a unit (a width) as described above.

In a starting LBA 212 in the HDD 103, a master boot record (MBR) 201 exists. Management information included in the MBR 201 includes a first globally unique identifier (GUID) Partition Table (GPT) address 202 indicating the reading start location of a first GPT area 204, and a second GPT address 203 indicating the reading start location of a second GPT area 209. As the first GPT address 202, the value of an LBA 214 is stored.

As the second GPT address 203, the value of an LBA 211 is recorded.

The first GPT area 204 includes information regarding partitions described below. For example, the first GPT area 204 includes location information regarding the location on the HDD 103 of a first partition 205, and GUID information indicating the application of the first partition 205. The first GPT area 204 includes signature information (header information) corresponding to the first GPT area 204 in the LBA 214 as the reading start location.

The HDD 103 has a plurality of partitions 205 to 208 different in application from each other. For example, the first partition 205 is an area that holds a loader and a kernel used for a start process. Although FIG. 2 illustrates an example where the HDD 103 has four partitions, the number of partitions may be other than four. In the current exemplary embodiment, a "partition" refers to a storage area, and "partition information" refers to LBA information regarding an LBA at the position where the storage area is partitioned.

The second GPT area 209 is a backup area for the first GPT area 204. Information included in the second GPT area 209 is similar (e.g., almost identical) to information included in the first GPT area 204. The second GPT area 209 and the first GPT area 204, however, include different self-location information and backup location information. For example, the self-location information included in the first GPT area 204 is the value of the LBA 214 of the first GPT area 204, and the backup location information included in the first GPT area 204 is the value of the LBA 211 of the second GPT area 209. In contrast, the self-location information included in the second GPT area 209 is the value of the LBA 211 of the second GPT area 209, and the backup location information included in the second GPT area 209 is the value of the LBA 214 of the first GPT area 204.

Thus, in a case where the first GPT area 204 is corrupted or tampered, the first GPT area 204 is recovered based on the second GPT area 209. Specifically, the first GPT area 204 is overwritten with the content of the second GPT area 209 and then is corrected to ensure the consistency between the above pieces of location information.

The second GPT area 209 includes signature information (header information) corresponding to the second GPT area 209 at the LBA 211 indicating the reading start location.

The last area of the HDD 103 is an unused area 210. In the image forming apparatus 1, the unused area 210 is an area that is not managed as a partition, and is an area that is not used. The state where the area is not used includes the state where the area is not used as a writing destination and a reading destination of data. In the present exemplary embodiment, an ending LBA 213 is the last LBA of the unused area 210.

Although a second GPT area is typically set in the last area of a storage device, the second GPT area 209 is not set in the last area of the HDD 103 in the present exemplary embodiment. This configuration can be employed in the context in which the physical size of a storage device varies from product to product or from vendor to vendor. In such a case, a margin such as an unused area is provided in the last area as illustrated in FIG. 2, whereby the same data can also be used in another storage device of a different size so long as the data falls within the range of the margin.

For example, the configuration of storage where use data is recorded up to the last area cannot be used in another storage device having a smaller capacity than that of the storage. In such a case, it is necessary to generate and manage a plurality of pieces of data to be written to the storage device. To reduce the costs of generating and managing the plurality of pieces of data, the unused area 210 may be provided.

Figure 3:
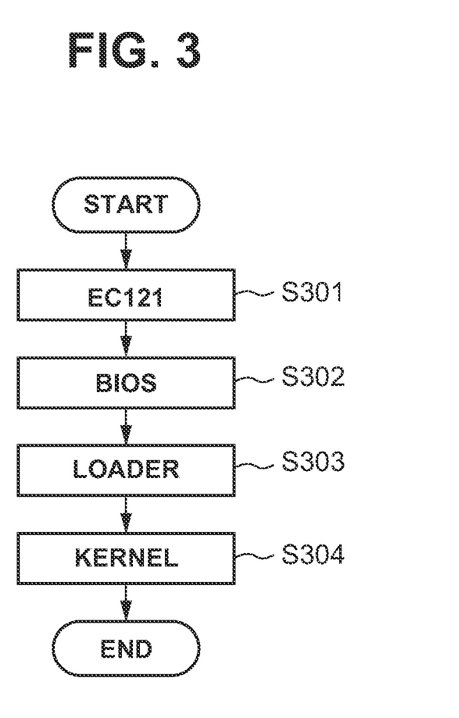
FIG. 3 is a flowchart illustrating an outline of a start process.

FIG. 3 is a flowchart illustrating the outline of a start process for the image forming apparatus 1.

First, if a power switch is turned on, then in step S301, the reset of the EC 121 is cancelled, and the EC 121 reads software for the EC 121 recorded in the non-volatile memory 115 and starts operating.

In step S302, the EC 121 determines whether the BIOS recorded in the non-volatile memory 115 is tampered. If there is no problem, the EC 121 cancels the reset of the CPU 101 and causes the CPU 101 to start a BIOS process. Next, the CPU 101 executes the BIOS process.

In step S303, the CPU 101 determines whether the loader saved in the HDD 103 is tampered, and also performs an initialization process for initializing each piece of hardware. If there is no problem with the result of the determination of whether the loader is tampered, the CPU 101 loads the loader from the HDD 103 into the RAM 104 and starts a loader process. In step S304, the CPU 101 determines whether the kernel saved in the HDD 103 is tampered. If there is no problem, the CPU 101 loads the kernel into the RAM 104 and starts a kernel process. The CPU 101 determines whether each piece of firmware included in the HDD 103 is tampered. If there is no problem, the CPU 101 sequentially starts the piece of firmware.

Figure 4:
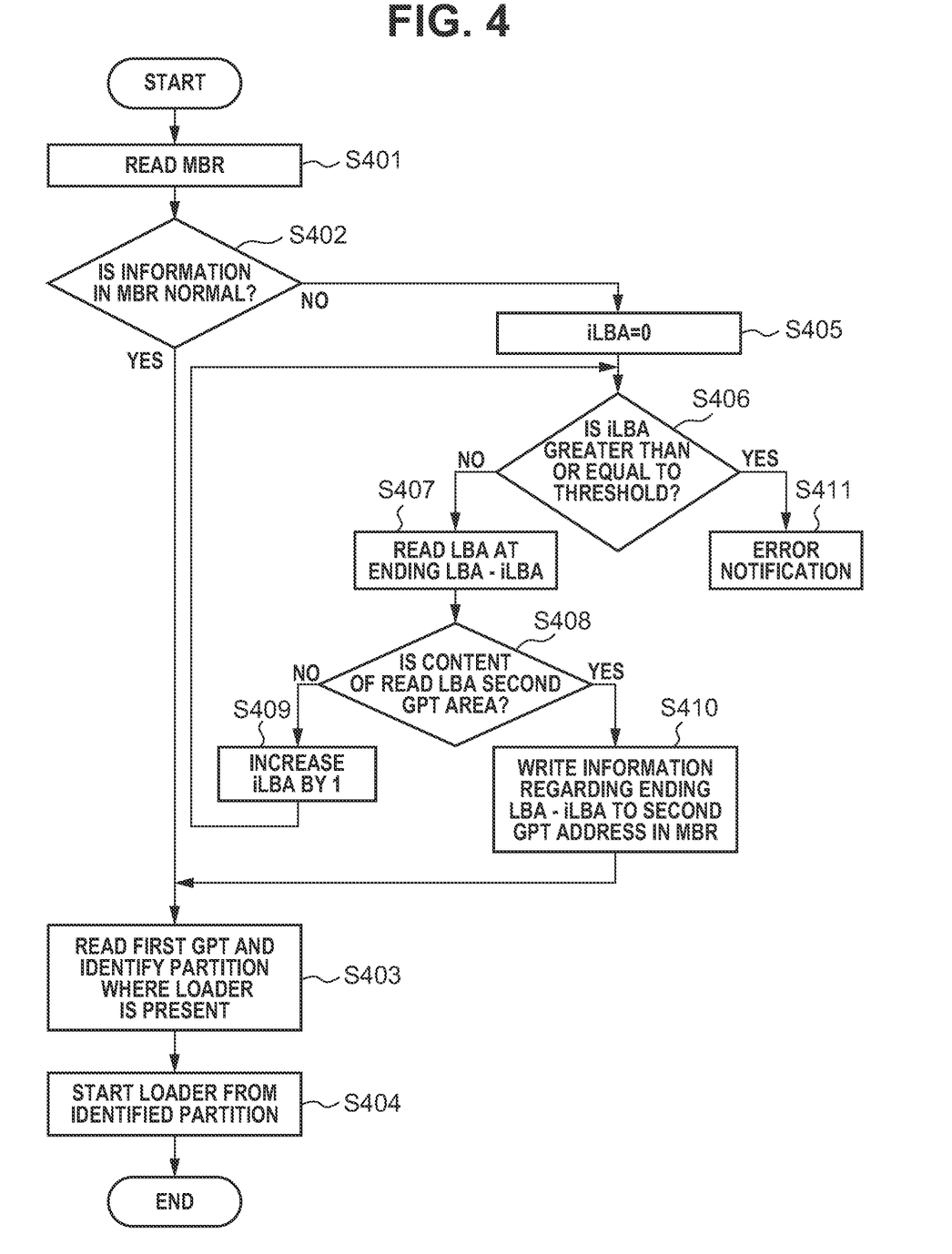
FIG. 4 is a flowchart illustrating a start process for starting a loader and a recovery process for recovering a master boot record (MBR).

FIG. 4 is a flowchart illustrating a processing flow in a normal state where the MBR 201 is read and started, and a processing flow in an abnormal state where a recovery process is performed in a case where information in the MBR 201 is corrupted, which are features of the present exemplary embodiment. FIG. 4 illustrates processing flows until the BIOS started in step S302 reads the loader. That is, FIG. 4 illustrates processing flows performed between steps S302 and S303.

In step S401, the CPU 101 reads the MBR 201 from the HDD 103. In step S402, the CPU 101 determines whether the content of the read MBR 201 is normal. The determination method may be a signature verification method, or may be a simplified method, such as checking a signature area included in the MBR 201. In the case of the checking of the signature area, it can be determined whether the content of the MBR 201 is normal based on whether the last two bytes of the MBR area are 0xAA55.

If the content of the MBR 201 is normal (YES in step S402), the processing proceeds to step S403. In step S403, the CPU 101 references the first GPT address 202 described in the MBR 201 and reads the first GPT area 204 at a location recorded in the first GPT address 202. Based on information described in the read first GPT area 204, the CPU 101 identifies a partition where the loader is present. Specifically, the CPU 101 scans partition entries included in the first GPT area 204. Then, the CPU 101 determines whether the partition type GUID of each entry is equal to a GUID having the loader, thereby identifying in which of the first partition 205 to the fourth partition 208 the loader is present. In step S404, the CPU 101 accesses the partition identified in step S403, reads the loader included in the identified partition, and starts processing for the loader. If the MBR 201 is normal, the processing proceeds to the loader process (step S303) through such a flow.

If, in contrast, the MBR 201 is not normal (NO in step S402), the processing proceeds to step S405. In step S405, the CPU 101 attempts to recover the second GPT address 203. First, the CPU 101 initializes a variable iLBA secured on the RAM 104. The variable iLBA is used to hold the number of scanned LBAs.

In step S406, the CPU 101 determines whether the value of the variable iLBA is greater than or equal to a threshold. The threshold may be a predetermined value set in advance, or the entire area of the HDD 103 may be set to the threshold by using the total number of LBAs. If the storage is the HDD 103, the total number of LBAs can be acquired by transmitting an identify command to the HDD 103. If an SSD or an eMMC is used instead of the HDD 103, the total number of LBAs can be acquired from the value of a register of the storage.

If the variable iLBA is less than the threshold (NO in step S406), the CPU 101 calculates an LBA to be read. A case is exemplified where scanning is performed in LBA units in order from the ending LBA 213.

In step S407, the CPU 101 reads a sector at a location obtained by subtracting the variable iLBA from the ending LBA 213 indicating the last location. Through the process of step S407, every time the variable iLBA is incremented, a sector is scanned by moving up from the ending LBA 213. Alternatively, the scanning may be performed starting from an intermediate sector. In such a case, the LBA to be read may be calculated by performing the calculation on the starting LBA 212 or the intermediate LBA instead of the ending LBA 213.

In step S408, the CPU 101 determines whether the content of the read LBA is the second GPT area 209. As the specific determination method, the signature verification method may be used, or the determination may be made based on whether the read LBA includes a signature area included in the second GPT area 209. For example, if the value of the ending LBA 213—the variable iLBA is equal to the LBA 211, the determination becomes YES.

If the content of the read LBA is not the second GPT area 209 (NO in step S408), the processing proceeds to step S409. In step S409, the CPU 101 increments the value of the variable iLBA. Then, the processing returns to step S406. In step S406, the CPU 101 makes the determination again. If the scanning is performed multiple times and the variable iLBA is greater than or equal to the threshold (YES in step S406), the processing proceeds to step S411. In step S411, the CPU 101 notifies the display 111 of an error. In a case where the threshold is set to a large value, an increase in the number of times the scanning process is performed lengthens the time until the display 111 is notified of an error.

If the content of the LBA read in step S407 is the second GPT area 209 (YES in step S408), the processing proceeds to step S410. In step S410, the CPU 101 writes a value obtained by subtracting the variable iLBA from the ending LBA 213, to the area of the second GPT address 203 in the MBR 201. Specifically, the CPU 101 writes the LBA value at which the second GPT area 209 is found, thereby recovering the content of the second GPT area 209. A value other than that of the second GPT area 209, such as the signature area where a fixed value should be written, may also be overwritten at this timing. Consequently, even if the first GPT area 204 is corrupted, it is possible to reference the second GPT area 209.

If step S410 is completed, the processes of steps S403 and S404 are performed similarly to the case where the MBR 201 is normal, and the regular start process is continued.

In the present exemplary embodiment, the restoration is performed by scanning the HDD 103 regarding the location of the second GPT area 209. Alternatively, the value of the location of the second GPT area 209 may be held in advance in the non-volatile memory 115 instead of the HDD 103, and the held value may be written to the second GPT address 203 without scanning the HDD 103.

Figure 5:
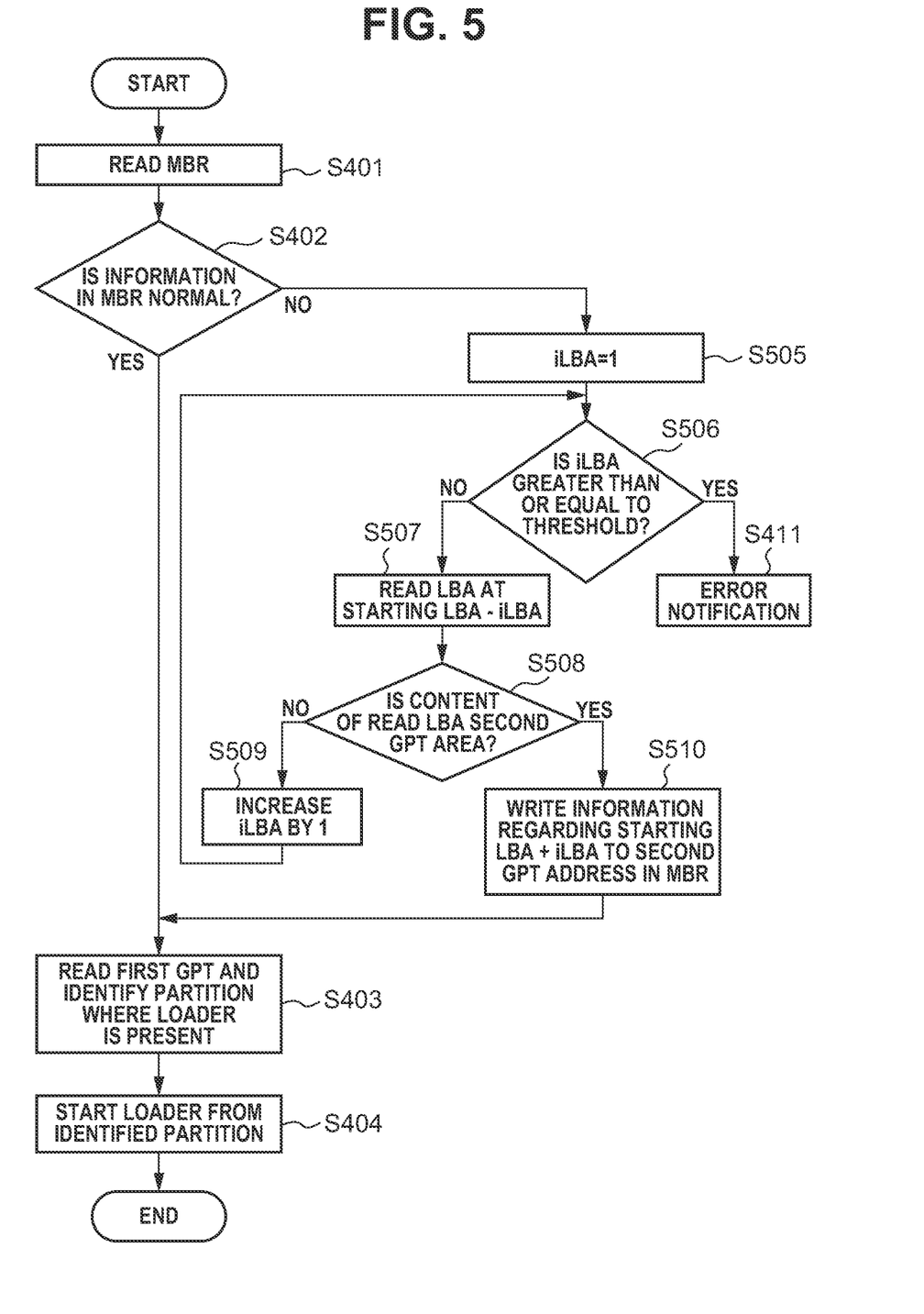
FIG. 5 is a flowchart illustrating a start process for starting the loader and a recovery process for recovering the MBR.

The recovery process for recovering the second GPT address 203 may be performed by another method. FIG. 5 illustrates a specific recovery process. Steps S401 to S404 and S411 are similar to those in FIG. 4, and therefore are not described. Steps S505 to S510, which are different from FIG. 4, are described here.

First, in step S505, the CPU 101 initializes a variable iLBA secured in the RAM 104 and adds one to the variable iLBA. In step S506, the CPU 101 determines whether the value of the variable iLBA is greater than or equal to a threshold.

The method for setting the threshold may be similar to that in step S406.

If the value of the variable iLBA is less than the threshold (NO in step S506), the CPU 101 calculates an LBA to be read. A case is exemplified where scanning is performed in LBA units in order from an LBA following the starting LBA 212.

In step S507, the CPU 101 reads a sector at a location obtained by adding the variable iLBA to the starting LBA 212 indicating the first location. By performing the process of step S507, every time the variable iLBA is incremented, a sector is scanned by moving down from the starting LBA 212. Alternatively, the scanning may be performed starting from an intermediate sector. In such a case, the LBA to be read may be calculated by performing the calculation on the intermediate LBA instead of the starting LBA 212. In a case where the calculation is started from the intermediate LBA, the variable iLBA may only need to be initialized in step S505.

In step S508, the CPU 101 determines whether the content of the read LBA is the second GPT area 209. The specific determination method may be similar to the concept of step S408.

If the content of the read LBA is not the second GPT area 209 (NO in step S508), the processing proceeds to step S509. In step S509, the CPU 101 increments the value of the variable iLBA.

If the content of the read LBA is the second GPT area 209 (YES in step S508), the processing proceeds to step S510. In step S510, the CPU 101 writes a value obtained by adding the variable iLBA to the starting LBA 212, to the area of the second GPT address 203 in the MBR 201. Specifically, the CPU 101 writes the LBA value at which the second GPT area 209 is found, thereby recovering the content of the second GPT area 209. A value other than that of the second GPT area 209, such as the signature area where a fixed value should be written, may also be overwritten at this timing.

Also in FIG. 5, the loop may be repeated until the variable iLBA changes from an upper limit determined in advance to zero.

According to the configuration of the present exemplary embodiment, even in a case where a reading start location is not present at a predetermined location with respect to the capacity of storage, it is possible to recover information recorded in an MBR.

OTHER EMBODIMENTS

Some embodiments can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-137678, which was filed on Aug. 26, 2021 and which is hereby incorporated by reference herein in its entirety.

What is claimed is:

1. An information processing apparatus comprising:
   a storage device that is non-volatile including a first storage area managed by at least one partition and a second storage area that is not managed by the at least one partition, and storing, in the second storage area, first information including partition information regarding the at least one partition, second information including the partition information, and management information including first location information indicating a reading start location of the first information and second location information indicating a reading start location of the second information; and
   a controller having one or more processors which execute instructions stored in one or more memories, the controller being configured to:
   read information based on location information;
   in a case where the read information is the reading start location of the second information, cause the storage device to store the location information regarding the read information, as the second location information; and
   in a case where the read information is not the reading start location of the second information, read information based on other location information different from the location information.

2. The information processing apparatus according to claim 1, wherein the controller determines whether the read information indicates the reading start location of the second information.

3. The information processing apparatus according to claim 1, wherein the other location information is information obtained by moving up the location information.

4. The information processing apparatus according to claim 3, further comprising a notification device configured to notify a user,
wherein in a case where the location information is moved up a predetermined number of times and reaches a predetermined location, the controller causes the notification device to notify the user of an error.

5. The information processing apparatus according to claim 1, wherein the location information is an end of location information regarding the storage device.

6. The information processing apparatus according to claim 1, wherein the controller determines whether the read information indicates the reading start location of the first information.

7. The information processing apparatus according to claim 1, wherein the other location information is information obtained by moving down the location information.

8. The information processing apparatus according to claim 7, further comprising a notification device configured to notify a user,
wherein in a case where the location information is moved down a predetermined number of times and reaches a predetermined location, the controller causes the notification device to notify the user of an error.

9. The information processing apparatus according to claim 1,
wherein the controller determines whether the management information is normal, and
wherein in a case where the controller determines that the management information is not normal, the controller executes control.

10. The information processing apparatus according to claim 9, wherein in a case where the controller determines that the management information is normal, the first information is read based on the first location information.

11. The information processing apparatus according to claim 10,
wherein the storage device stores a loader in the first storage area, and
wherein the controller reads the loader from the first storage area by reading the first information and executes the loader.

12. The information processing apparatus according to claim 9, further comprising a second non-volatile storage device different from the storage device,
wherein based on execution of basic input/output system (BIOS) in the second non-volatile storage device, the controller determines whether the management information is normal.

13. A control method for controlling an information processing apparatus comprising a non-volatile storage device including a first storage area managed by at least one partition and a second storage area that is not managed by the at least one partition, and storing, in the second storage area, first information including partition information regarding the at least one partition, second information including the partition information, and management information including first location information indicating a reading start location of the first information and second location information indicating a reading start location of the second information, the control method comprising:
reading information based on location information;
in a case where the read information is the reading start location of the second information, causing the non-volatile storage device to store the location information regarding the read information as the second location information; and
in a case where the read information is not the reading start location of the second information, reading information based on location information different from the location information.

* * * * *